United States Patent [19]

Willis et al.

[11] Patent Number: 4,667,240

[45] Date of Patent: May 19, 1987

[54] TIMING CORRECTION CIRCUITRY AS FOR TV SIGNAL RECURSIVE FILTERS

[75] Inventors: Donald H. Willis, Indianapolis; Russell T. Fling, Noblesville; Todd J. Christopher, Indianapolis, all of Ind.

[73] Assignee: RCA Corporation, Princeton, N.J.

[21] Appl. No.: 761,179

[22] Filed: Jul. 31, 1985

[51] Int. Cl.$^4$ .................. H04N 5/213; H04N 5/95
[52] U.S. Cl. .................. 358/167; 358/337; 358/36; 360/36.1
[58] Field of Search .............. 358/21 R, 36, 160, 167, 358/320, 337; 360/9.1, 36.1

[56] References Cited

U.S. PATENT DOCUMENTS

| | | | |
|---|---|---|---|
| 4,393,397 | 7/1983 | Holmes | 358/36 |
| 4,559,560 | 12/1985 | Murata et al. | 358/167 |
| 4,581,642 | 4/1986 | Poetsch et al. | 358/167 |

*Primary Examiner*—James J. Groody
*Assistant Examiner*—Robert Michael Bauer
*Attorney, Agent, or Firm*—E. M. Whitacre; P. J. Rasmussen; E. P. Herrmann

[57] ABSTRACT

In memory-based video signal processing systems such as frame recursive filters, for example, system performance is dependent upon critical timing relationships between incoming signals and delayed signals produced from the memory. Video signal from various sources, e.g. VTR's, tend to have jittering time bases that generally have prevented the use of such memory-based processing systems. The jittering signals may be standardized, in sampled data format, by effecting adaptive signal delays responsive to a measure of the relative phase of the sampling clock with respect to horizontal synchronizing pulses. The phase measure is used to control an interpolator which combines successive samples in proportions to develop sample values that should have occurred at the sample times had the signal not been jittering.

9 Claims, 7 Drawing Figures

| SKEW (X) | 1-K | K | Q | DELAY $E_D$ | TOTAL DELAY |
|---|---|---|---|---|---|
| 0 | 1 | 0 | 0 | $T_S$ | $2T_S$ |
| 1 | 7/8 | 1/8 | 1/32 | $7T_S/8$ | $15T_S/8$ |
| 2 | 6/8 | 2/8 | 2/32 | $3T_S/4$ | $14T_S/8$ |
| 3 | 5/8 | 3/8 | 3/32 | $5T_S/8$ | $13T_S/8$ |
| 4 | 4/8 | 4/8 | 3/32 | $T_S/2$ | $12T_S/8$ |
| 5 | 3/8 | 5/8 | 3/32 | $3T_S/8$ | $11T_S/8$ |
| 6 | 2/8 | 6/8 | 2/32 | $T_S/4$ | $10T_S/8$ |
| 7 | 1/8 | 7/8 | 1/32 | $T_S/8$ | $9T_S/8$ |

TIMING CORRECTION CIRCUITRY AS FOR TV SIGNAL RECURSIVE FILTERS

The invention relates to apparatus to effect temporal alignment of corresponding signal samples from successive frames of non-standard video signals in a memory based video signal processing system.

BACKGROUND OF THE INVENTION

The quality of video signals can be enhanced by the process of recursive filtering. In this process incoming baseband video signals are proportioned and added to corresponding signals from previous frames of the video signal which are proportioned to supplement incoming video signals. The video signal, to a large degree, is redundant or coherent from frame-to-frame and, thus, signal representing like picture points (pixels) from frame-to-frame sum linearly. Noise components attendant the video signal, on the other hand, tend to be non-coherent and sum as the square root of the sum of the squares of the respective pixel noise components, thus, effecting noise reduction or alternatively signal-to-noise improvement.

In order to perform recursive filtering it is necessary to combine signals corresponding to the same pixels from successive frames. Signal from successive frames may be made available by applying the signal or the signal sums to a delay element having a precise one-frame period delay. The most practical method of developing the frame-delayed signals is to sample the signals and store them in a sampled data delay register, e.g. a charge transfer device, or to convert the sampled signal to digital format and store the digital samples in e.g. a random access memory. Since the tolerance of the frame delay period is extremely critical, the sampling rate is usually selected to be an integer multiple of the frame frequency. The frame delayed signal is accessed by reading the respective samples from memory the same multiple of sample periods after the samples were stored in the memory.

Digital video processing systems may employ several sampling systems. In one such system the sampling clock is locked to the color subcarrier, and in another, the sampling clock is locked to horizontal synchronizing signals. This invention is applicable to the former system and other systems which do not use the techniques of the latter system. It is applicable to video signals in various formats such as NTSC, PAL and SECAM.

Consider, for example a standard NTSC video signal. A sampling clock having a frequency which is an even integer multiple of the color subcarrier frequency will have an integer multiple of clock periods per frame period. This feature facilitates arranging a memory device to produce exactly one frame of delay to applied signals simply by designing the memory device to have the same integer multipl of storage sites which are addressed consecutively.

However, not all TV signals which are compatible for use in NTSC systems conform precisely to the NTSC standard format. For example, signals produced from video recorders and/or video discs have jittering time bases due to instabilities in their transport mechanism. The jitter results in varying frame periods in the reproduced signal. The system processing the signal will develop a sampling signal from the subcarrier contained in the jittering signal so that the number of sample periods per frame period may also vary. In any case, experience has shown that in processing many signals which are nominally NTSC signals, the phase of the sampling clock relative to the horizontal and vertical synchronizing signals varies from frame to frame. This phase variation tends to degrade the performance of a recursive filter due to a reduction in frame-to-frame video signal coherence because a precise one frame period delay is not available as an integer number of clock periods.

In order to fully realize the beneficial potential of a recursive filter, either the input signals or the delayed signals must be time-shifted so that both signals have samples that correspond to the same picture points. This time shifting is denoted "skew correction". Skew as defined herein is the phase difference between the sampling or clock signals and the horizontal synchronizing (Hsync) signal of the incoming signal. Skew is the fraction of a clock period of phase difference between the clock signal and the signal HSYNC. For convenience skew may be measured with respect to the last clock pulse occurring before the center of Hsync and is assumed constant for the duration of each respective line of video signal following an HSYNC pulse. Each pixel of a particular horizontal line has the same skew as the first pixel of that line. Each horizontal line has in general a different skew value except in the case of a standard signal. Thus, a "standard signal" as used herein is a signal in which every horizontal line has the same skew value (which may be zero) and a "non-standard signal" is one in which the skew value varies between one or more lines. A "standard" PAL broadcast signal, because of its 25 Hz offset, is a non-standard signal as herein defined.

SUMMARY OF THE INVENTION

The present invention includes a delay element and video signal processing circuitry for processing incoming and delayed signal. In one embodiment of the invention, apparatus is coupled to detect and alter skew of the incoming signal so that the incoming signal and the delayed signals will have substantially equal skew values from line-to-line. In a further embodiment of the invention, skew detection and correction apparatus is coupled to the output of the delay element to match the skew of the delayed signal to the skew of the incoming signal.

DETAILED DESCRIPTION

The invention will be described in terms of digital circuitry, however, it is applicable to analog signal processing with the appropriate change of circuitry. The signal is presumed to be in parallel-bit binary format with samples occurring at a four times color subcarrier rate. The samples are also assumed to have been converted from analog to digital form under control of a clock signal, $\phi S$, phase locked to the color subcarrier. In the drawings, broad arrows interconnecting circuit elements are parallel-bit busses. Narrow arrows are single conductor connections.

Figure 1:
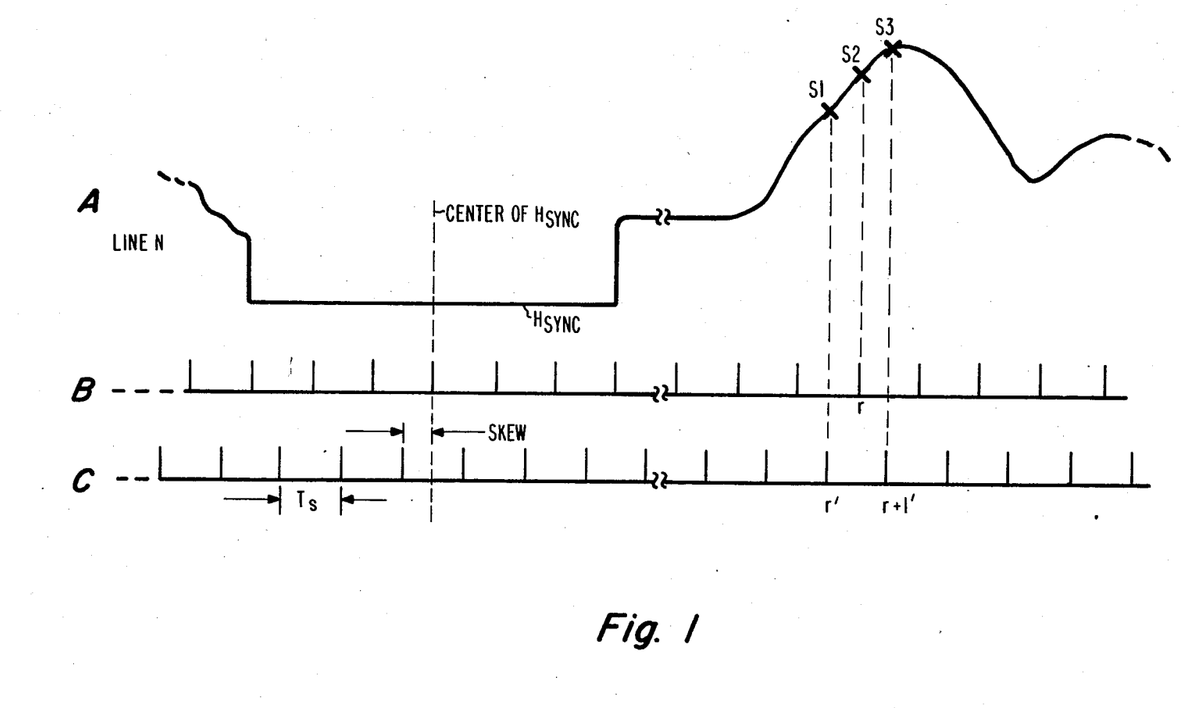
FIG. 1 is a timing diagram useful in describing skew and the desired skew correction.

Referring to FIG. 1, the waveform A represents a portion of one horizontal line of, e.g. luminance signal, including the horizontal synchronizing pulse (note the waveforms of FIG. 1 are not drawn to scale). Waveforms B and C represent sampling (system) clock waveforms. The pulses of waveform B are assumed to occur at the points in time that a subcarrier locked clock, locked to a standard signal, would occur. Put another way, if waveform A corresponds to line n of a stationary image, then waveform B represents the desired sampling (system) clock for each successive frame, i.e. without skew. Alternatively, a clock signal having constant skew may be used. In either of these systems, the sampling clock pulse r always occurs at the same point in time relative to the HSYNC pulse. This point in time is represented by the sample S2 on waveform A. Waveform C represents a subcarrier locked clock which exhibits a degree of skew. The number of pulses per frame period contained in waveform C may not be constant from frame-to-frame. Generally, the difference in the number of whole clock pulses in a frame period can be absorbed in the blanking intervals. The sampling phase error (skew) which is a fractional portion of a clock period, however, may only be corrected by operation on the samples themselves or on the sampling clock signal.

One method of correction is to adjust the sample values on a line-by-line basis so that the adjusted samples conform to samples that would be taken by a clock with zero skew or with some constant skew. For example, the sample values generated by the clock signal of waveform C may be adjusted to equal or approximate corresponding sample values that would be generated by the clock signal of waveform B. In the figure, clock pulse r' of waveform C is assumed to correspond to clock pulse r of waveform B. Clock pulse r' is advanced in time or skewed by one-half of one clock period, TS, with respect to clock pulse r. Clock pulse r' generates a sample value S1. Desirably, clock pulse r' should occur coincident with clock pulse r and generate the sample value S2.

Replacing the sample taken coincident with clock pulse r' with a sample having a value approximately equal to S2 effectively advances the timing of the signal taken with the sampling clock signal C so that it matches the signal which would have been taken had the zero-skew sampling clock signal B been used.

The values of the replacement samples may be calculated by interpolating, as a function of the skew value, successive sample values taken coincident with the clock pulses of waveform C. Simply stated, the interpolator calculates a replacement sample by scaling a given sample by a fraction 1−K (where the skew equals the fraction K times the sampling clock period TS) scaling the next subsequent sample by a value, K, and adding the two scaled samples. The replacement samples provided by this simple interpolator have values approximating the values of samples taken with a sampling clock that is delayed by KTS. When compensating delays of TS are inserted in signal paths which parallel the interpolator, the interpolated signal is effectively advanced by KTS relative to these parallel signals.

However, this simple interpolator is satisfactory only if the clock signal has a frequency that is an order of magnitude greater than the highest frequency in the processed signals. For conventional video signals having sample rates of $4f_{sc}$, the approximations provided by this interpolator will generally be unsatisfactory.

Figure 2A:
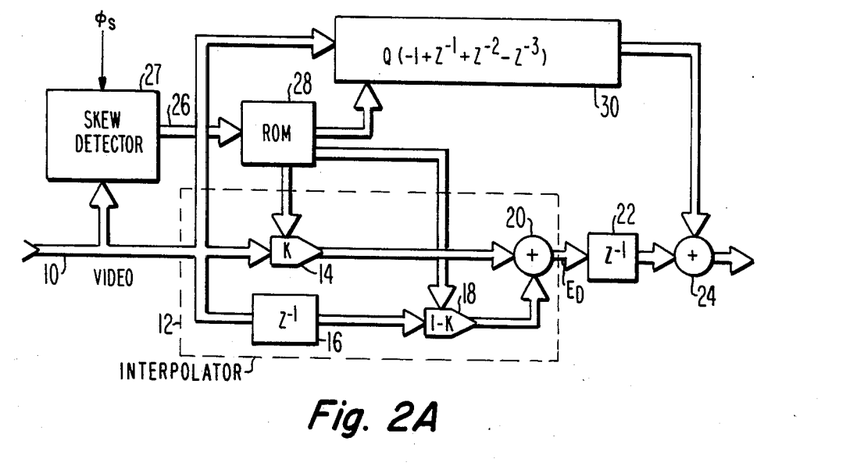
FIG. 2A is a block diagram of a signal interpolation circuit for performing skew correction.

FIG. 2A illustrates circuitry for calculating sample replacement values to develop effective signal delays dependent upon the skew value of the sampling clock. This circuitry is one embodiment of the skew correction portion of the invention illustrated in FIGS. 4 and 5. The skew value is a measure, in, for example, fractions of a clock or sample period, of the difference between the time of the last clock pulse, or the occurrence of the last signal sample occurring immediately before the center of the horizontal synchronizing pulse, and the time of the center of the horizontal synchronizing pulse. For purposes of explanation, the measure of skew will be in eighths of a clock period.

In FIG. 2A, the circuitry circumscribed by the broken line 12 performs a skew dependent interpolation. This circuitry, however, exhibits an amplitude roll-off at higher frequencies. Circuit element 30 develops a frequency dependent signal which is added to the sample values produced by the circuitry 12 to compensate for the high frequency roll-off. Compensating signal developed by circuit element 30 is scaled by a factor, Q, which is dependent on the inherent gain of the element 30 and on the applied skew correction.

Video signal samples including horizontal synchronizing components are applied to input port 10 and coupled to the skew detector 27. The sampling or system clock, $\phi_S$, is also coupled to skew detector 27 which measures the skew corresponding to a horizontal line of video signal. Detector 27 provides a skew value, which may be a binary number, that corresponds to the numerator of the fraction defining the skew offset.

Figure 2B:
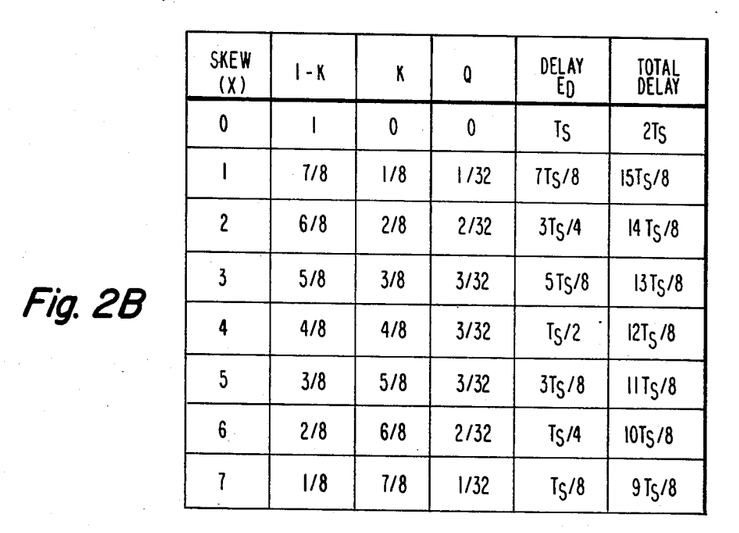
FIG. 2B is a table of control values applied to the circuit of FIG. 2A and the corresponding effective signal time shift produced by the circuit.

The skew values produced by detector 27 are applied to the address input port 26 of read-only-memory (ROM) 28. ROM 28 responsive to the skew values produces scaling factors K, 1−K and Q which are respectively applied to scaling circuits 14, 18 and compensating signal generator 30. The respective scale factors corresponding to the possible skew values are enumerated in the table of FIG. 2B. The current or incoming video sample on input port 10 is coupled to the scaling circuit 14 wherein it is weighted by the value (K). The previous sample, delayed via delay element 16 having its input connected to input port 10, is applied to scaling circuit 18 wherein it is weighted by the value (1−K). The weighted current and previous samples are summed in adder 20 which develops an output sample $S_O$ given by $$S_O = S_{r+1}(K) + S_r(1-K) \tag{1}$$

where $S_{r+1}$ and $S_r$ represent the sample values occurring at sampling points r+1' and r' respectively. Referring to FIG. 1, if the skew is zero, i.e. the pulses of waveform C are coincident with those of waveform B so that pulse r' is coincident with pulse r, then K equals zero and $S_O = S_r$ as desired. In general, if the skew is an integral multiple (X, $0 \leq X \leq 7$) of eighths of a sample period, then $$S_O = X/8 \, S_{r+1} + (8-X)/8 \, S_r. \tag{2}$$

The effective signal delays $E_D$ generated at the output of adder 20 for X equal to 0, 1, 2 . . . 7 are listed under the heading DELAY $E_D$ in FIG. 2B. It is noted that as the value of K increases, the effective signal delay imparted to the signal decreases.

The output of adder 20 is coupled to one input of adder 24 by a one sample period delay element 22. The other input to adder 24 is coupled to the output of the compensating signal generator 30. The total signal delays generated by the circuitry between input part 16 and the output of adder 24 are listed in the rightmost column of the table in FIG. 2B for the various skew values.

Compensating signal generator 30 which is defined by the transfer function Q times $(-1+Z^{-1}+Z^{-2}-Z^{-3})$ in conventional Z transform notation, is a sampled data filter which has a cosinusoidal frequency response. The frequency response has null points at zero Hertz and at multiples of half the sampling frequency. For example, the first maximum in the frequency response occurs at approximately 4.77 MHz when a clock frequency of 14.3 MHz is used. The group delay of the filter is 3TS/2. Delay element 22 is coupled between interpolator 12 and adder 24 so that the total delay of the circuit including interpolator 12 is equal to the group delay of filter 30 when interpolator 12 is conditioned to provide a signal delay of TS/2.

In general, the amplitude response of the compensating signal generator 30 is increasing in the frequency range where the amplitude response of the interpolator 12 is rolling off. Adding a portion of the compensating signal having an increasing amplitude response (with frequency) to the output signal from the interpolator 12 having a decreasing amplitude response produces a signal with a relatively flat frequency response. The roll off of interpolator 12 changes with the value of the scale factors K. Thus, as the roll off changes, the amount of signal required to compensate for the roll off must be changed. Theoretically, it has been determined that, for the indicated transfer function of compensating signal generator 30, the factors, Q, listed in the table of FIG. 2B, corresponding to the respective scale factors, K, will condition the signal output from adder 24 to exhibit a relatively flat frequency response across the frequency band occupied by the video signals for selectable delays from one to nearly two sample periods.

Figure 3A:
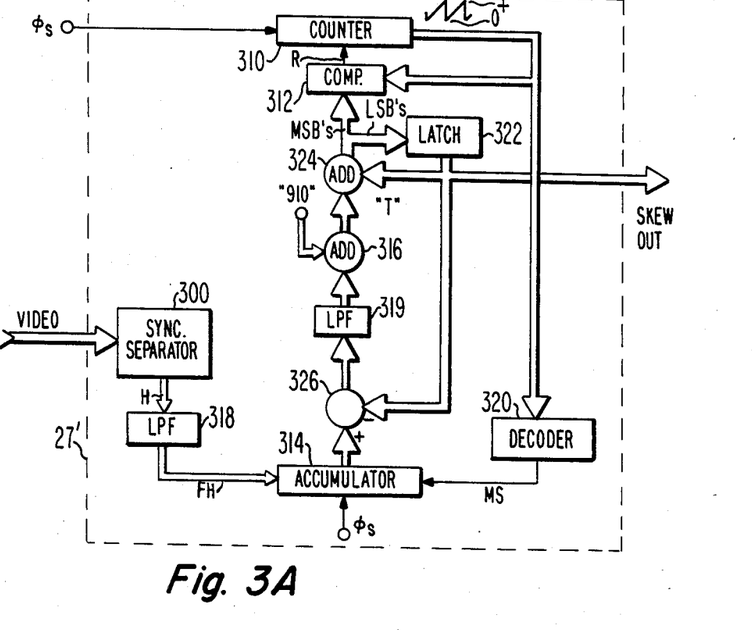
FIG. 3A is a block diagram of skew measuring circuitry.

FIG. 3A illustrates an exemplary skew detecting circuit which may be employed to control the FIG. 2A skew correcting circuit. An integrated circuit which includes a functionally similar skew detector is type DPU 2532 Deflection Processor Unit which is described at pages 47-72 of the data book "Digit 2000 NTSC Double-Scan VLSI Digital TV System" edition 1985/5 of ITT Intermetall, Freiburg, W. Germany.

In FIG. 3A video input signal is applied to the sync separator 300 which separates the horizontal synchronizing component, H, therefrom and applies this signal to the low-pass filter 318. Low-pass filter 318 reduces signal noise in the synchronizing signal and produces the signal FH which is applied to the accumulator 314. The period of the signal FH is determined as follows. The skew detector 27′ includes a counter 310 which is clocked by the sampling clock, $\phi S$ (assumed to be at a rate of four times subcarrier, e.g. $4f_{sc}$) and reset by a comparator 312 when the count equals the period, T, of the horizontal synchronizing component FH. Accumulator 314 measures the time difference between the center of pulse FH and the occurrence of a master sync pulse MS provided by a decoder 320 coupled to the output of counter 310 when the count produced by counter 310 reaches a predetermined value. This time difference (or error) signal is scaled so as to represent the error in terms of cycles (and fractional cycles) of the sampling clock. The scale factor is proportional to the reciprocal of twice the amplitude of signal FH at the time of occurrence of signal MS. The scaled error signal is low-pass filtered in filter 319 and added in adder 316 to the number 910 which equals the number of $4f_{sc}$ sampling clock periods in one line of an NTSC standard signal. Adder 316 develops the period indicating signal, T, which controls the threshold of comparator 312 thereby locking counter 310 to the horizontal synchronizing component of the video input signal.

When non-standard signals are received, the period of counter 310 will be in error by an amount related to to the skew of the sampling clock signal. This results because counter 310 only counts integer cycles of the sampling clock signal whereas the period of the sync pulses FH may include a fraction of one clock cycle. Since the master sync pulse MS is generated by decoding the count of counter 310 it, will occur only at integer cycles of the sampling clock and so will also be in error by the amount of the sampling clock skew. The scaled output of accumulator 314 will also include the skew error because it is synchronized by pulse MS.

Skew errors are detected by the latch 322 and the adder 324. Skew, it will be recalled, is the time difference between the sample clock and the center of horizontal sync expressed in fractions of a clock cycle as shown in FIG. 1. If it is assumed that the value of the period indicating signal, T, is correct, and if the fractional part of signal T is not zero, then line-to-line changes in the skew will occur. As an example, if the period of signal FH is exactly 910.1 clock cycles long, then the sampling clock $\phi_S$ will precess with respect to sync (FH) at the rate of exactly 0.1 clock cycles per line. Thus, if the skew is zero at the start of line 1, it will be 0.1 at the start of line 2, 0.2 at the start of line 3 and so on. Skew data is generated by means of adder 324 which adds the skew of the previous line (stored in latch 322) to the period signal T. The fractional part of the sum is then stored in latch 322 which functions as an accumulator for generating the skew data. The fractional part of the sum in latch 322 is the skew value output signal used to control the skew correction circuitry. The integer part of the signal from adder 324, is applied to comparator 312 for determining the period of counter 310.

Skew detection is based on the assumption that the period indicating signal T correctly represented the period of the video input signal. From the previous discussion, however, the scaled output of accumulator 314 contains the skew error because it is timed by pulse MS which can only occur at integer clock cycles. This error is removed from signal T, by means of subtracter 326 which subtracts the detected skew data provided by latch 322 from the output of accumulator 314.

Figure 3B:
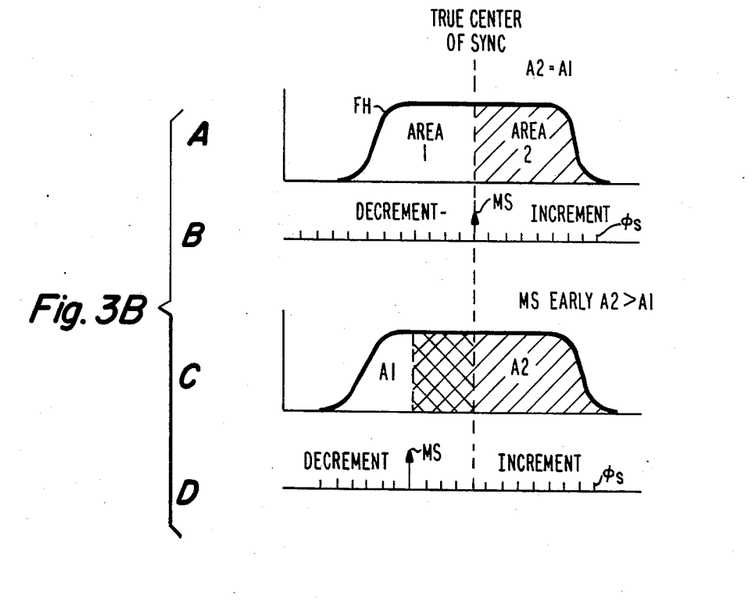
FIG. 3B is a waveform diagram useful in describing the function of the FIG. 3A circuit.

Accumulator 314 provides phase measurements to an accuracy finer than the resolution of the system clock $\phi S$. It may be constructed as described, for example, in U.S. Pat. No. 4,471,299 which issued Sept. 11, 1984. FIG. 3B herein provides a simplified illustration of how the measurements may be made. Waveform A shows pulse FH as a function of time. Accumulator 314 essentially measures the areas of pulse FH which preceed (Area 1) and follow (Area 2) pulse Ms indicated in waveform B. This may be done by setting the accumulator value initially to zero with the leading transition of pulse FH, and decrementing the count in the accumulator in proportion to the magnitude of pulse FH at each clock cycle (vertical tic marks) which preceeds pulse MS. The count in the accumulator is then incremented in proportion to the amplitude of pulse FH at each clock cycle after pulse MS. The trailing edge of pulse FH halts operation of the accumulator. If pulse MS is exactly aligned with the center of pulse FH (as shown) then areas 1 and 2 will be equal and the accumulator output will be zero indicating zero skew. If pulse MS preceeds the center of pulse FH, then the areas will differ (as shown in waveforms C and D) and the accumulator output will be proportional to twice the double cross-hatched area illustrated. This area represents the time difference between pulse MS and the true center of the horizontal sync pulse FH. One may then scale the accumulator output to express the result in terms of sampling clock cycles (and fractions thereof).

Figure 4:
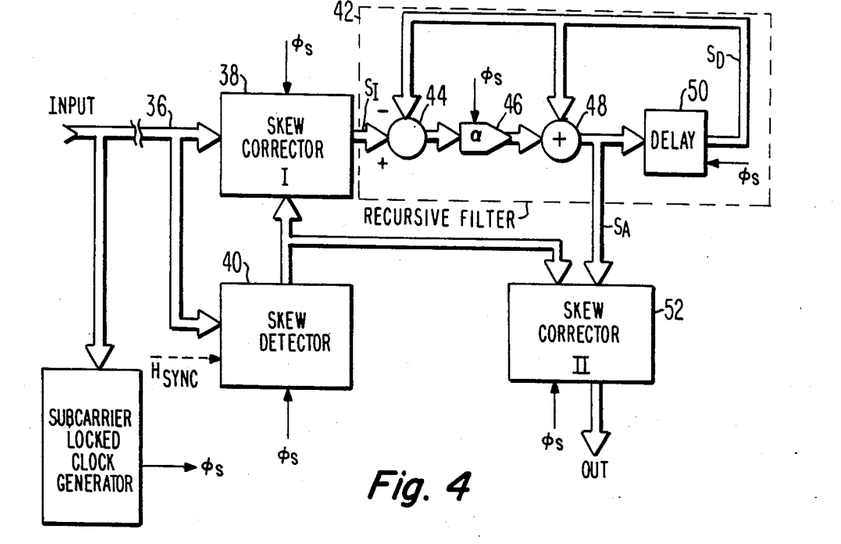
FIGS. 4 and 5 are block diagrams of alternate embodiments of video recursive filters incorporating skew correction apparatus.

FIG. 4 is a first embodiment of a video recursive filter including skew correction for processing non-standard signals according to the invention. The circuit elements circumscribed by the broken line 42 form a recursive filter for use with standard video signals. In circuit 42, video signals are applied to one input of subtracter 44 and signals delayed by one image period from delay element 50 are applied to a second input of subtracter 44. Signal differences from subtracter 44 are applied to scaling circuit 46 wherein the differences are scaled by a factor α which is typically less than one. Scaling circuit 46 may be adaptive in that the factors α may be varied as a function of image motion or as a function of the degree of noise in the signal or both. The scaled differences are coupled to one input of adder 48 and delayed signal from delay element 50 is coupled to a second input of adder 48. Adder 48 produces noise reduced signal which is coupled to the input of delay element 50. The output signal, $S_A$, from adder 48 is given by the equation $$S_A = \alpha S_I + (1-\alpha)S_D \quad (3)$$

where $S_I$ and $S_D$ represent the amplitudes of the incoming and delayed signals respectively. Signal $S_D$ corresponds to the value of signal $S_A$ from the previous image period. If the signals $S_I$ and $S_D$ are both baseband video signals (i.e. luminance signals, color difference signals or primary color signals) and there is no image motion, the signal component of $S_D$ will equal the signal component of $S_A$ and $S_I$.

When this condition is satisfied, equation 3 may be expanded by substituting signal $S_A$ for signal $S_D$. Assuming this is done, and like terms collected, it will be seen that the signal component of $S_A$ is equal to the signal component of the incoming signal $S_I$. The RMS value of the noise component of the output signal converges to the RMS value of the incoming noise component scaled by the factor $\sqrt{\alpha/(2-\alpha)}$, where typically $\alpha \leq 1$.

To utilize the circuitry 42 the incoming signals must have a constant (or zero) skew value from image period-to-image period. A skew corrector, 38, such as the circuitry illustrated in FIG. 2A, is coupled in series with the input port of subtracter 44. Skew corrector 38 accepts input signal samples at bus 36 and conditions the samples to have a constant skew value referenced to a common datum as described in conjunction with FIG. 2A.

The input signal samples at bus 36 are also coupled to a skew detector 40. The system or sampling clock, $\phi_S$, is also coupled to the skew detector 40. Skew detector 40 measures the skew of the sampling clock $\phi_S$ relative to the horizontal synchronizing pulse contained in the input signal and applies the skew values to skew corrector 38. The skew value is measured for each horizontal line and held constant for the respective line interval. (In an alternative arrangement, horizontal synchronizing pulses, Hsync, from e.g. a sync separator may be applied directly to the skew detector 40 in place of input 36 so that skew detector 40 need not contain the requisite circuitry to extract the synchronizing pulses from the input signal.)

In conventional television receivers, the processed signals are displayed using a deflection system that is phase locked to the horizontal synchronizing signal components of the input signal. The skew correction applied to the signals coupled to the recursive filter tends to misalign the image data relative to the input synchronizing pulses and the system clock. Thus, a second skew corrector is required to realign the processed (noise reduced) signals for display by a deflection system that is phase locked to the horizontal synchronizing signal components of the incoming signals. The second skew corrector, 52, is coupled to the output of adder 48 and receives skew data from skew detector 40. The output signal, OUT, from skew corrector 52 has the same signal skew as the incoming signal at bus 36.

The second skew corrector, 52, may be similar to the first skew corrector 38. However, skew corrector 52 must be arranged to perform a complementary signal delay relative to skew corrector 38. By complementary signal delay is meant that if skew corrector 38 effectively delays the signal by an Xth fraction of a sample period, then skew corrector 52 should provide an effective delay of $(1-X)$th fraction of a sample period. Thus, if the skew corrector 38 and 52 are in the form of the circuitry illustrated in FIG. 2A, the scale factors K and $(1-K)$ in the skew corrector 52 will be reversed with respect to the scale factors K and $(1-K)$ used in skew corrector 38. Alternatively, skew corrector 52 may be identical to skew corrector 38 if the skew signals applied to skew corrector 52 from skew detector 40 are the complements of the skew signals applied to skew corrector 38.

Note that the effect of the combination of the two skew correctors 38 and 52 on the processed signal is to delay the displayed image by three full sample periods. This three sample delay may be compensated in the deflection circuitry. On the other hand, the three sample period image shift can be absorbed in the overscan of the display tube and will not be at all noticeable.

Figure 5:
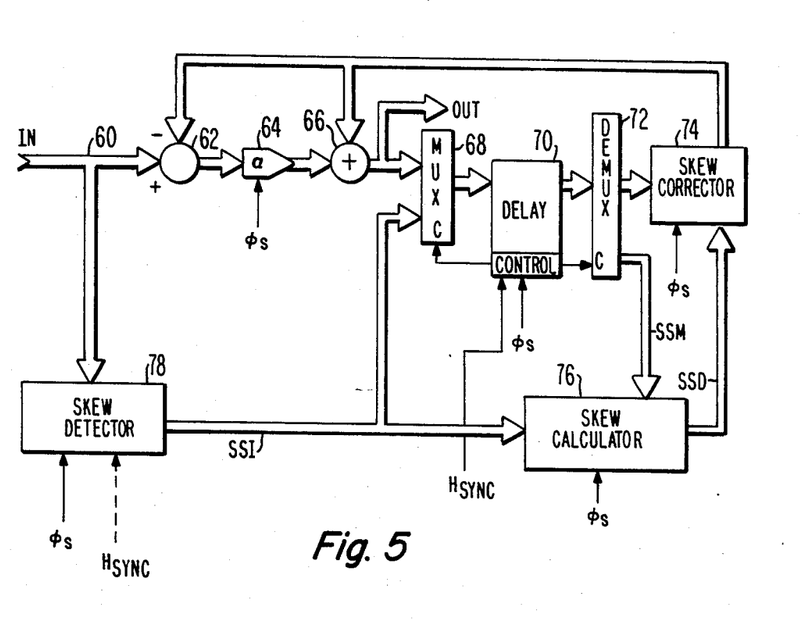

FIG. 5 illustrates a second embodiment of a video recursive filter for processing non-standard signals wherein only a single skew corrector is required. In FIG. 5, skew correction is performed on the delayed signal from the delay element. The delayed signal is skew altered to have a skew similar to the skew of the incoming signal. The skew of the noise reduced signal is therefore made equal to the skew of the incoming signal and does not require alteration for display purposes.

Incoming video signal on bus 60 is applied to a first input port of subtracter 62. Delayed and skew corrected signal from skew corrector 74 is coupled to a second input port of subtracter 62. The total delay of the delayed and skew corrected signal is arranged so that the two signals applied to subtracter 62 represent like pixels in successive frames (for a frame recursive filter) or corresponding pixels from successive fields (for a field recursive filter). Thus the delay interval provided by the delay element 70 is an image interval less the inherent processing delays of the intervening circuit elements coupled in series with the delay element.

The signal differences produced by subtracter 62 are applied to scaling circuit 64 which weights the differences by the factor $\alpha$. The weighted differences are applied to adder 66 in which they are combined with delayed and skew corrected signals from skew corrector 74, to develop noise reduced video signals. The signals produced by adder 66 are coupled to the input port of the delay element 70 the output of which is coupled to the skew corrector 74.

In order to alter the skew of the delayed signal so that the skew of the delayed signal conforms to the skew of the input signal it is necessary to have a measure of the skew of both the incoming signal and the delayed signal. This skew information is provided by a single skew detector 78 which is coupled to the input bus 60 (or Hsync). The skew value is determined at the beginning of each horizontal line of the incoming signal and is valid for the following line interval. The detected skew value is coupled to the delay element 70 via multiplexor 68 and stored with the signal samples from the horizontal line corresponding to the measured skew value. This may be accomplished by including the skew value in a sample position prior to the first sample of active video. Note each horizontal line has an interval including horizontal sync, color burst etc., which information need not be stored or delayed for recursive filtering. Further it is generally known in memory based video signal processing systems to operate the memory in a start-stop mode to preclude storage or delay of the signal in these intervals in order to reduce the size of the memory or delay element. Consequently there is some latitude in the design of the delay system, and the skew data for each line can easily be accommodated in the delay element.

Multiplexor 68 is conditioned by the memory controller to couple noise reduced signal from adder 66 to delay element 70 during intervals of active video information for each horizontal line and to couple the skew value from detector 78 to delay element 70 during a non-active interval of each line. Similarly demultiplexor 72 couples delayed signal from delay element 70 to the skew corrector 74 during intervals of active video information and couples the delayed skew data to the skew calculator, 76, during the non-active interval of each delayed line. The timing and control of the delay element 70, multiplexor 68, and demultiplexor 72 will readily be devised by one skilled in the art of sampled data processing and will not be described in detail herein.

Current skew data from the skew detector 78 is also coupled to the skew calculator 76. Skew calculator 76 determines the difference in skew, SSD, between the skew of the incoming signal, SSI, and the skew of the delayed signal, SSM. The skew difference (SSD=SSI−SSM) which, if the measured skew is in integral fractions of a sample period, will also be in integral fractions of a sample period. The skew differences SSD are applied as control skew values to the skew corrector 74 which may be configured similar to the FIG. 2A interpolator. In practice, skew control values of 1+SSD are used so that negative signal delays are avoided. The extra signal delay may be compensated for in the delay element 70.

In the foregoing description, a skew value is developed for each horizontal line, and the measured skew value is used to correct all of the samples in the corresponding horizontal line. The skew measurements may be compared from line-to-line to develop the rate of change of skew. Responsive to the rate of change of skew, the skew values may be altered within a line interval.

What is claimed is:

1. Video signal processig apparatus for processing a video signal in sampled data format, the occurrence of signal samples possibly exhibiting varying amounts of skew relative to a horizontal synchronizing signal associated with said video signal, said signal processing apparatus comprising:

means for applying said video signal and its associated horizontal synchronizing signal;

skew detecting means, coupled to said means for applying said video signal and responsive to said horizontal synchronizing signal, for generating a control signal corresponding to a time difference between the occurrence of a predetermined sample and a predetermined point of said horizontal synchronizing signal; and means, coupled to said means for applying said video signal, including a cascade connection of a memory means for storing a signal corresponding substantially to an integer number of image fields of said video signal, and skew correcting means having control signal input terminal coupled to said skew detecting means, said skew correcting means being responsive to said control signal for effecting a time displacement of said video signal.

2. The apparatus set forth in claim 1 wherein said skew correcting means is coupled between said means for applying said video signal and said memory means and said cascade connection further includes signal proportioning and combining means, coupled between said skew correcting means and said memory means, for proportioning and combining respective signals from said skew correcting means and said memory means, and for applying the combined signals to an input of said memory means.

3. Video signal processing apparatus for processing a video signal in sampled data format, which samples may exhibit varying amounts of skew relative to a horizontal synchronizing signal associated with said video signal, said signal processing apparatus comprising:

means for applying said video signal and its associated horizontal synchronizing signal;

a processing circuit, having an input port and an output port, for combining a signal applied to its input port with a delayed signal provided from within said processing circuit;

skew detection circuitry, responsive to said horizontal synchronizing signal, for generating a skew value signal corresponding to the difference between the time of occurrence of a predetermined signal sample and a predetermined point in said horizontal synchronizing signal, respective skew values being generated for successive lines; and means, including skew correcting means, coupled between said means for applying said video signal and said processing circuit, and responsive to said skew value signal to effect an alignment of corresponding pixels in successive image periods of said video signal.

4. The video signal processing apparatus set forth in claim 3 wherein the means including skew correcting means further includes:

further skew correcting means, having an input port coupled to the output port of said processing circuit, for conditioning a signal output from said processing circuit to exhibit a skew similar to the skew of said input video signal, said further skew correcting means being responsive to said skew value signal and generating a signal delay complementary to a signal delay produced by said skew correcting means.

5. The video signal processing apparatus set forth in claim 3 wherein said processing circuit comprises a recursive filter including means for proportioning and combining said video signal and said delayed signal and a delay means having an input coupled to said proportioning and combining means and an output for producing said delayed signal.

6. Video signal processing apparatus for processing a video signal in sampled data format, which samples are phase-locked to a color subcarrier component of the video signal and which samples may exhibit varying amounts of skew relative to a horizontal synchronizing signal associated with said video signal, said signal processing apparatus comprising:

an input port for applying said video signal and its horizontal synchronizing signal;

skew detection circuitry, responsive to said horizontal synchronizing signal, for generating a skew value signal corresponding to the difference between the time of occurrence of a predetermined sample and a predetermined point of said horizontal synchronizing signal, respective skew values being generated on successive lines;

signal processing means, having first and second input ports and an output port, for combining signal samples applied to said first and second input ports to generate a processed output signal at its output port;

delay means, having an input port coupled to the output port of said signal processing means, and having an output port at which a signal delayed by substantially one video signal image interval with respect to signal applied to its input port is available;

skew correcting means, coupled between one of said video signal input port and said delay means output port and one of said first and second input ports of said signal processing circuit, said skew correcting means being responsive to said skew value signal for temporally aligning corresponding pixels of said video signal and said delayed signal; and means for coupling the one of said video signal input port and said delay means output port not coupled to the skew correcting means to the one of said first and second input ports of said signal processing circuit not coupled to said skew correcting means.

7. The video signal processing apparatus set forth in claim 6 wherein said delay means is also coupled to said skew detection circuitry and is conditioned to delay a skew value associated with each horizontal line of the the video signal and wherein said skew correcting means is responsive skew value signal from said skew detecting circuitry and a delayed skew value signal from said delay means to condition the relative skew of delayed signal samples to conform to the skew of corresponding incoming video samples.

8. The video signal processing apparatus set forth in claim 7 wherein said skew correcting means includes means for subtracting the delayed skew value signal from the said skew value signal to generate a skew value by which the delayed signal is to be skew corrected.

9. Video signal processing apparatus comprising:

an input terminal for applying a video input signal including a horizontal synchronizing component, said input signal occurring in sampled data format with samples phase locked to a color subcarrier reference of said video signal;

skew detecting means coupled to said input terminal for measuring the difference between the occurrence of a predetermined signal sample and a predetermined point of said horizontal synchronizing component and generating a skew signal corresponding thereto;

means, having a first input port coupled to said input terminal and having a second input port, for proportioning and combining signals applied to said first and second input ports and providing a proportioned and combined signal at an output port;

multiplexing means, having first and second input ports coupled respectively to said output port and said skew detecting means for time division multiplexing said skew signal and said proportioned and combined signal at a multiplexing means output port;

delay means, having an input port coupled to said multiplexing means output port, for providing at a delay means output port, a signal delayed by substantially one image period;

demultiplexing means, having an input port coupled to said delay means output port, for providing said skew signal and said proportioned and combined signal to first and second output ports thereof;

skew adjusting means, having a control signal input port, having a signal input port coupled to the second output port of said demultiplexing means, and having an output port coupled to the second input port of said proportioning and combining means, said skew adjusting means for effecting temporal alignment of corresponding pixels from successive image intervals represented by signals applied to the first and second input ports of said proportioning and combining means;

calculating means, coupled to the first output port of said demultiplexing means and to said skew detecting means, for developing a skew control signal corresponding to the difference in skew between said video signal and delayed video signal; and means for coupling said control signal to said control signal input port of said skew adjusting means.

* * * * *